United States Patent
Ratnakar et al.

(10) Patent No.: US 6,233,359 B1
(45) Date of Patent: May 15, 2001

(54) FILE SIZE BOUNDED JPEG TRANSCODER (FSBJT)

(75) Inventors: Viresh Ratnakar, Sunnyvale; Victor Ivashin, Danville, both of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/183,552

(22) Filed: Oct. 29, 1998

(51) Int. Cl.⁷ ........................................ G06K 9/36
(52) U.S. Cl. .............................. 382/250; 375/240.2
(58) Field of Search ............................ 382/233, 250, 382/251, 239; 348/405, 416, 419; 375/240.2

(56) References Cited

U.S. PATENT DOCUMENTS

| | | |
|---|---|---|
| 5,253,078 | 10/1993 | Balkanski et al. . |
| 5,461,422 * | 10/1995 | Hsieh .................... 348/405 |
| 5,677,736 * | 10/1997 | Suzuki et al. ............. 382/250 |
| 5,706,216 | 1/1998 | Reisch . |
| 5,734,755 * | 3/1998 | Ramchandran et al. ...... 382/250 |
| 5,754,696 | 5/1998 | Miyashita et al. . |
| 5,768,436 | 6/1998 | Keesman . |
| 5,774,597 | 6/1998 | Wilson . |
| 5,778,102 | 7/1998 | Sandford, II et al. . |
| 5,838,834 * | 11/1998 | Saito ..................... 382/251 |
| 6,002,801 * | 12/1999 | Strongin et al. ........... 382/233 |

* cited by examiner

*Primary Examiner*—Amelia M. Au
*Assistant Examiner*—Jingge Wu
(74) *Attorney, Agent, or Firm*—Michael T. Gabrik

(57) ABSTRACT

A technique that reduces the size of an existing JPEG file or set of DCT coefficients to satisfy a certain bit budget by setting to zero coefficients whose magnitude is below a certain threshold and which occur after a certain ordinal number in the zig-zag scan. The cutoff ordinal number is chosen using a clever savings calculation strategy. This strategy is implemented by filling appropriate savings values in an array of savings values, Savings[1], ... , Savings[63]. The value Savings[n] is exactly the number of bits saved by reducing the thresholding cutoff ordinal number from n +1 to n. When a non-zero coefficient is set to zero, bits are saved because two runs of zeros (the one preceding it and the one following it) get combined into a single, longer run of zeros. The exact number of bits saved can be calculated by adding the bits needed to code the previous and next runs, and subtracting the bits needed to code the combined run. Some special conditions (runs longer than 16 and end-of-block conditions) need to be carefully factored into the computation.

36 Claims, 5 Drawing Sheets

FILE SIZE BOUNDED JPEG TRANSCODER (FSBJT)

BACKGROUND OF THE INVENTION

1. Field of the Invention

This invention relates generally to an image compression technique, and more particularly to a technique that further reduces the size of an existing compressed file to satisfy a certain bit budget in such a way that the information discarded is minimal.

2. Description of the Related Art

The emergence of compression standards such as JPEG (an acronym for "Joint Photographic Experts Group") has led to many digital imaging systems and applications that create and maintain content only in JPEG compressed format. For instance, in most digital still-imaging cameras (DSCs) such as the Epson PhotoPC 600, Kodak DC-10, etc., pictures captured by the camera are immediately compressed within the camera and (together with the corresponding thumbnail images) are stored in the camera's storage system as JPEG files. Due to constraints within the camera, the thumbnail images (which are also in JPEG format) are constrained to be less than a particular size. Therefore, any images which exceed the size limitation imposed by the camera must be reduced.

Under the current state of the art, some camera-based image compression techniques reduce the size of captured images to meet the constraints of the camera by incorporating into the compression process a procedure that simply sets to zero some of the higher frequency coefficients regardless of their value. Higher frequency coefficients carry less important information than lower frequency coefficients. Thus, turning a high frequency coefficient to zero usually does not present a problem, except when the magnitude of that coefficient is high. In that case, important information will be lost if the high-magnitude coefficient is turned to zero.

Another proposed technique for reducing the magnitude of some quantized coefficients during compression in order to reduce compressed size is set forth in U.S. Pat. No. 5,754,696. For each block of quantized DCT coefficients in the zig-zag scan order, this technique considers two possibilities: (1) coding the coefficients as they are, and (2) reducing the magnitude of low-frequency coefficients above a threshold (i.e., coefficients occurring before a certain ordinal number in the zig-zag scan whose magnitude is above a certain threshold). For the coefficients for which such a magnitude reduction reduces the bit-rate (essentially the coefficients whose magnitude class as defined in the Huffman coding model changes as a result of magnitude reduction), the technique retains the magnitude reduction.

This is a rather inefficient technique. The lower-frequency coefficients are perceptually the most important ones, and reducing their magnitude is bound to affect the image quality adversely. Moreover, the file size reduction obtained in this technique is because of reductions in non-zero magnitude categories, which give small reductions at the expense of much quality.

OBJECTS OF THE INVENTION

Therefore, it is an object of the present invention to overcome the aforementioned problems associated with further reducing a compressed file size.

It is another object of this invention to provide a transcoding technique to guarantee a smaller compressed file size via a thresholding strategy where the information discarded is minimal.

It is a further object of this invention to provide a transcoding technique to be used in a transform-based compression process such as JPEG to generate a smaller compressed file size by reducing the magnitude of coefficients occurring after a selected cutoff ordinal number in the zig-zag scan whose magnitude is below a certain threshold.

It is still another object of this invention to provide a transcoding technique to be used in a transform-based compression process such as JPEG to generate a smaller compressed file size by choosing the cutoff ordinal number via a sophisticated savings calculation strategy.

It is yet another object of this invention to provide a transcoding technique to be used in a transform-based compression process such as JPEG to generate a smaller compressed file size by increasing the lengths of runs of coefficient values of zero to provide a relatively large size reduction at a small quality expense.

SUMMARY OF THE INVENTION

The present invention provides an apparatus and method for generating a second array of frequency-ordered coefficients from a first array of frequency-ordered coefficients using a transcoding technique. The second array of coefficients is generated by establishing an array of predetermined threshold values, one corresponding to each of the coefficients in the first array coefficients, determining a cutoff ordinal number in the first array of coefficients, and setting to zero each of the frequency coefficients in the first array having an ordinal number greater than or equal to the determined cutoff ordinal number and having a magnitude less than or equal to its corresponding threshold value.

In another feature of the invention, the determining step above may additionally comprise generating an array of bit-savings values, one corresponding to each ordinal number in the first array. In this case, each bit-savings value is indicative of a number of bits that would be saved by setting to zero all of the coefficients in the first array having an ordinal number greater than or equal to the corresponding ordinal number (n) and having a magnitude less than or equal to the corresponding threshold value T[n]. Preferably, each bit-savings value is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n+1 and having a magnitude less than or equal to T[n+]. In accordance with the invention, each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than 16 and end-of-block conditions.

In accordance with a further feature of the invention, the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

The transcoding technique of the present invention may be applied in an imaging device, such as a digital still-image camera, or in a system, such as a computer system. Moreover, the technique may be implemented using either software, hardware or combination thereof. If the technique is implemented, either in whole or in part, with software, then the software may be embodied on any processor-readable medium such as a memory, a disk, or a signal on a line.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

JPEG, which uses the discrete cosine transform (DCT) as its basis function, is the most widely used compression method in consumer digital still-cameras on the market. For that reason, the transcoding technique of the present invention will be described in the context of JPEG. However, the technique of the present invention is not limited to JPEG, but may be extended to compression algorithms that use other linear-transform-based basis functions including the discrete sine transform, the discrete hadamard transform and wavelet transforms.

We begin by providing a brief overview of the JPEG compression and decompression processes. JPEG uses the DCT to transform still-image data from its spatial or pixel domain representation to its compressed or frequency domain representation in which the data can be more efficiently coded. The transcoding technique disclosed herein is designed to take advantage of the properties of the DCT.

Figure 1:
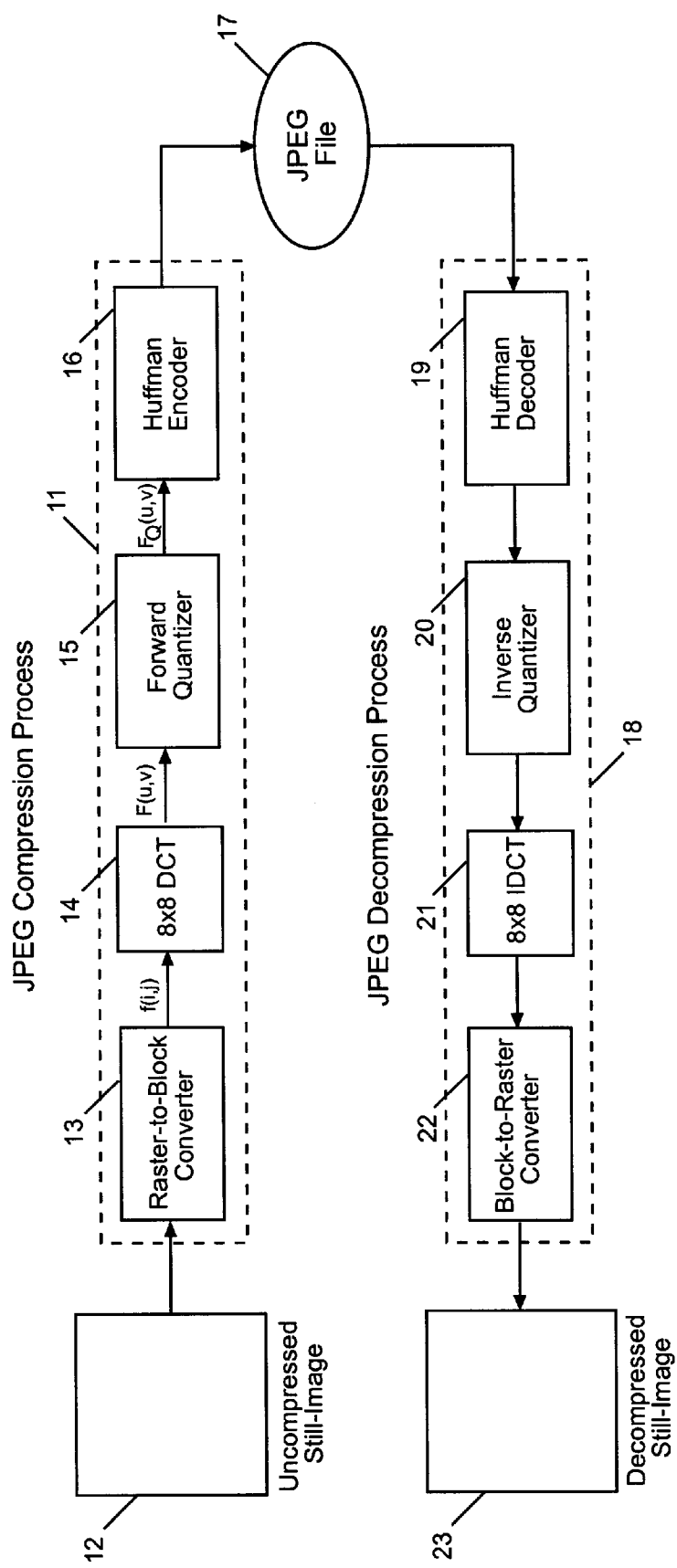
FIG. 1 is a block diagram depicting the JPEG compression and decompression process.

The JPEG compression and decompression process is illustrated schematically in FIG. 1. The compression process is performed in an encoder and operates on a block-by-block basis. Each block size is typically 8×8, although other block sizes may be used. As shown in FIG. 1, an uncompressed still-image is decomposed into 8×8 blocks of pixels by a raster-to-block converter. These blocks are then transformed by a forward 8×8 DCT 14 to produce a corresponding set of 8×8 DCT blocks. The 8×8 DCT block F(u, v) of a spatial domain 8×8 block of samples f(i, j) is computed as:

$$F(u, v) = \frac{\alpha_u \alpha_v}{4} \sum_{i=0}^{7} \sum_{j=0}^{7} C_{i,u} C_{j,v} f(i, j), \quad (1)$$

where, $$C_{x,y} = \cos\frac{(2x+1)y\pi}{16}, \quad (2)$$

and, $$\alpha_x = \begin{cases} 1, & x \neq 0 \\ 1/\sqrt{2}, & \text{otherwise.} \end{cases} \quad (3)$$

After output from the forward 8×8 DCT 14, each of the 64 DCT coefficients is uniformly quantized in a forward quantizer 15 in conjunction with a 64-element quantization table Q, which can be derived empirically to discard information which is not visually significant. In this compression process, the only loss incurred during the compression comes from the quantization of F(u,v) to $$F_Q(u, v) = \text{RoundOff}\left(\frac{F(u, v)}{Q(u, v)}\right),$$

where Q is the 8×8 quantization table.

After quantization, the DCT data in each block is ordered into a "zig-zag" sequence which facilitates entropy coding by placing low frequency coefficients (which are more likely to be non-zero) before the high frequency coefficients (which are more likely to be zero). The data is then Huffman coded in a Huffman encoder 16 to further compact the data. In this Huffman encoding process, the JPEG algorithm compresses each 8×8 block of quantized DCT coefficients, which may be identified in the JPEG zig-zag order as C(0), C(1), . . . , C(63), by scanning the sequence of coefficients looking for runs of zeros. Using a 4-bit variable rrrr to represent the number of consecutive zeros, C(n) to represent the next non-zero coefficient, and the variable ssss to represent the number of bits needed to code C(n), the JPEG compression process, generates a sequence of data of the form rrrr, ssss, . . . Compact codes for each rrrr, ssss sub-sequence and each non-zero coefficient in the sequence are then obtained from a Huffman table which is available to the encoder 16 to generate a JPEG compressed bit-stream or JPEG file 17 which may be stored and/or transmitted. Additionally, rrrr values greater than or equal to 16 are first broken up into multiple lengths of exactly 16 zeros (which forms a special symbol, R16, in the Huffman table), followed by a final rrrr value less than 16. Further, another special symbol (EOB) is used to code the "End-Of-Block" case when the last non-zero coefficient is not C(63).

In decompression, the image is reconstructed from the compressed bit-stream in a decoder 18 using the symmetrical reverse process. The JPEG decompression process begins by decoding the compressed bit-stream in a Huffman decoder 19, which has access to the Huffman table, to regenerate the 8×8 blocks of quantized DCT coefficients. The coefficients are reordered using an inverse zig-zagging procedure and the blocks are then fed through an inverse quantizer 20. In the next step, the 8×8 inverse discrete cosine transform (IDCT) 21 operates on the 8×8 blocks of DCT coefficients to generate a stream of 8×8 blocks of pixels. A block-to-raster converter 22 converts these blocks into decompressed still-image 23. The IDCT can convert the coefficients F(u,v) back to the pixels f(i, j), exactly:

$$f(i, j) = \sum_{u=0}^{7} \sum_{v=0}^{7} \frac{\alpha_u \alpha_v}{4} C_{i,u} C_{j,v} F(u, v). \quad (4)$$

However, because the decompression process will actually work with the quantized coefficients, $F_Q$, only an approximation $f_Q$ of f will be obtained as follows:

$$f_Q(i, j) = \sum_{u=0}^{7} \sum_{v=0}^{7} \frac{\alpha_u \alpha_v}{4} C_{i,u} C_{j,v} F_Q(u, v) Q(u, v). \quad (5)$$

The file size bounded JPEG transcoder (FSBJT) technique of the present invention is applied to the output of the Huffman decoder 19. That is, the transcoding technique operates on 8×8 blocks of quantized DCT coefficients obtained by decoding the compressed bit-stream of an existing JPEG file in the Huffman decoder 19. In this regard, it should be noted that this technique is different from the situation where a JPEG file of a certain size is created from an original pixel domain representation of an image. In the latter situation, there are many things that can be done, such as selecting the DCT quantizers appropriately, to ensure that the resulting JPEG file does not exceed the predetermined size limit. In the former situation, however, there is much less freedom since the DCT has already been applied and the quantization has already been done. In generating one JPEG file from another JPEG file, in accordance with the present invention, the starting data is quantized DCT coefficients.

Figure 2:
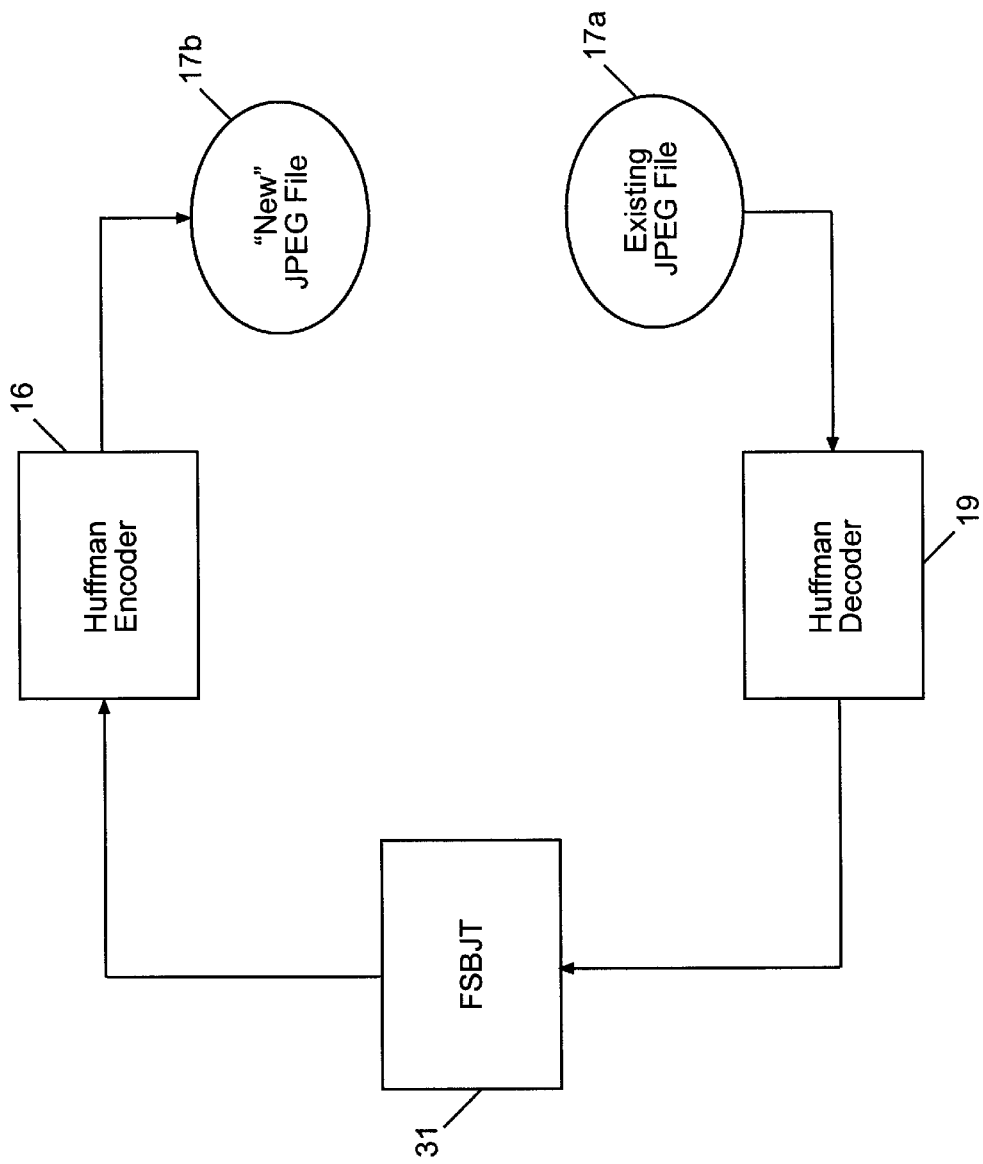
FIG. 2 is a block diagram illustrating a transcoding process in accordance with the present invention.

Referring now to FIG. 2, the process of generating a "new" JPEG file which satisfies a certain bit budget B from an existing JPEG file which exceeds B will be described. As shown schematically in FIG. 2, the compressed bit-stream of the existing JPEG file 17a is fed into the Huffman decoder 19 to regenerate the 8×8 blocks of quantized DCT coefficients. These blocks of coefficients are then input into a file size bounded JPEG transcoder 31 where the transcoding occurs. The transcoding technique selectively sets to zero certain quantized coefficients. After transcoding the DCT data is fed into the Huffman encoder 16 to generate a "new" JPEG file.

The transcoding reduces the size of the existing JPEG file so that it satisfies a certain bit budget B in such a way that the information discarded is minimal. In one application of the invention, the technique operates on a JPEG file which exceeds the constraining bit budget B to generate another JPEG file that satisfies the bit budget B. In another application, the technique may be used on a JPEG file that initially satisfied the size constraint but now exceeds B as a result of a compressed domain operation that was applied to the file.

One way to generate a more compact bit-stream from quantized DCT coefficients would be to simply start setting non-zero coefficients to zero, starting with the highest ordered non-zero coefficients in the sequence and continuing down the order until the bit budget B is met. The problem with this approach is that there may be some blocks in which higher-ordered coefficients have high magnitudes. Turning these coefficients to zero would result in some visible disturbance in the image.

The present invention avoids this problem by employing a clever algorithm which selectively turns only low-magnitude coefficients to zero; high-magnitude coefficients, regardless of their order, are not turned to zero. To accomplish this, the underlying algorithm uses a table or array of predetermined threshold values, one for each order of coefficients of the quantized DCT coefficients. That is, there is a first threshold value for all of the C(63) coefficients, a second threshold value for all of the C(62) coefficients, etc. When a particular order of coefficients is thresholded, each coefficient in that order (one from each 8×8 block) has its magnitude compared against the corresponding threshold value, and if its magnitude is less than or equal to that corresponding threshold value, its magnitude is set to zero. The set of thresholds used is a precomputed table, $T[1], \ldots, T[63]$. One way to precompute this table is to try FSBJT with several possible threshold tables in the desired application, with a large number of test images, and to choose that table that gives the best average quality.

A possible "trial and error" approach to implementing this scheme would be to first threshold only the $63^{rd}$ order of coefficients and recalculate the bit total to determine if the bit budget B is satisfied. If this does not bring the bit total within B, the $62^{nd}$ order of coefficients would also be thresholded and the bit total recalculated to determine if it is less than B. This process would then continue, thresholding as many orders of coefficients as required, until the bit budget B is met. Depending on the initial bit total and the bit budget B, this approach may be very time consuming.

The algorithm of the present invention avoids this "trial and error" approach and instead provides a much more efficient way of determining how many orders of coefficients, beginning with the $63^{rd}$, must be thresholded to satisfy the bit budget B. This is done by making a first pass of the data to generate an array of savings values by filling in a savings table which will contain the number of bits to be saved by thresholding all coefficients at or above a particular order. From this savings table, a cutoff (1–64), indicative of the orders of coefficients that must be thresholded to satisfy B, is determined, and all coefficients of an order greater than or equal to the cutoff are thresholded. For example, if the cutoff is 61, each of the $61^{st}$, $62^{nd}$ and $63^{rd}$ coefficients is thresholded. Note that a cutoff of 64 means that no coefficient is thresholded, and that thresholding is never applied to the DC coefficient (zig-zag index 0) as the least value of cutoff is 1. After the cutoff is determined, the appropriate coefficients are thresholded in a second pass of the data. Each block of DCT coefficients is then encoded in accordance with the JPEG standard. The resulting size is guaranteed to be within the bit budget B (except in some extreme cases described later).

To describe the FSBJT algorithm in detail, we first fix the notation that will be used to describe a compact block of quantized DCT coefficients. Such a block B has these components: {B.DC, B.num, B.zz[ ], B.val[ ], B.ssss[ ]}. B.DC is the DC value of the block, and is never thresholded by FSBJT. B.num is the number of non-zero AC coefficients in the block. B.zz[ ], B.val[ ], and B.ssss[ ] are arrays giving the zig-zag index (which is a value in the range 1, . . . , 63), the coefficient value, and the ssss value of each non-zero AC coefficient in the block, respectively. Only the array entries with indices in the range 1, . . . , B.num are meaningful. Additionally, for simplicity of subsequent presentation, we assume that B.zz[0] always contains the value 0.

The key procedure used in FSBJT is a procedure that we call "FillSavings." The task of FillSavings is to fill appropriate values in an array of values, Savings[1], . . . , Savings[63]. The value Savings[n] is exactly the number of bits saved by reducing the "thresholding cutoff ordinal number" from n+1 to n. We now present the workings of FillSavings in pseudo-code. The main idea used in FillSavings is that when a non-zero coefficient is set to zero, bits are saved because two runs of zeros (the one preceding it and the one following it) get combined into a single, longer run of zeros. The exact number of bits saved can be calculated by adding the bits needed to code the previous and next runs, and subtracting the bits needed to code the combined run. Some special conditions (runs longer than 16 and end-of-block conditions) need to be carefully factored into the computation. The notation H(X) is used here to denote the length of the code for the symbol X in the AC Huffman table, where X is either the symbol R16, or the symbol EOB, or a symbol of the form rrrrssss formed by combining a run-length (rrrr) less than 16 with an ssss value (which is also less than 16), as rrrrssss=(rrrr <<4) |ssss.

```
Procedure FillSavings
Initialize each Savings[n] to 0, 1 ≤ n ≤ 63.
for each block B
    last := B.zz[B.num]    //"last" will always be the index (in zig-zag
                           //order) of the last non-zero coefficient.
    for i := B.num downto 1
        n := B.zz[i]       //Now update the value of Savings[n].
        if( |B.val[i] | > T[n] ) then
            next := i      //Save the location of the next non-zero
                           coefficient.
        else
            //This coefficient will get set to zero when thresholded. Add to
            //Savings [n] the bits needed to code the preceding run length.
            rrrr := n − B.zz[i − 1] − 1//Length of preceding run.
            ssss := B.ssss[i]
            while (rrrr ≥ 16) do
                Savings[n] := Savings[n] + H(R16)
                rrrr := rrrr − 16
            Savings[n] := Savings [n] + H(rrrrssss) + ssss
            if (n = last ) then
                //There is no succeeding run of zeros.
                if (n = 63) then
                    //We will introduce an extra EOB in this block on
                    //reducing cutoff from n+1 to n.
                    Savings[n] := Savings[n] − H(EOB)
                last := B.zz[i − 1]
            else
                rrrr := B.zz[next] - n - 1//Length of succeeding run.
                ssss := B.ssss[next]
                while (rrrr ≥ 16) do
                    Savings[n] := Savings[n] + H(R16)
                    rrrr := rrrr − 16
                Savings[n] := Savings[n] + H(rrrrssss)
                rrrr := B.zz[next] − B.zz[i − 1] − 1
                //rrrr is the new combined run length.
                while (rrrr ≥ 16) do
                    Savings[n] := Savings[n] − H(R16)
                    rrrr := rrrr − 16
                Savings[n] := Savings[n] − H(rrrrssss)
```

Figure 3:
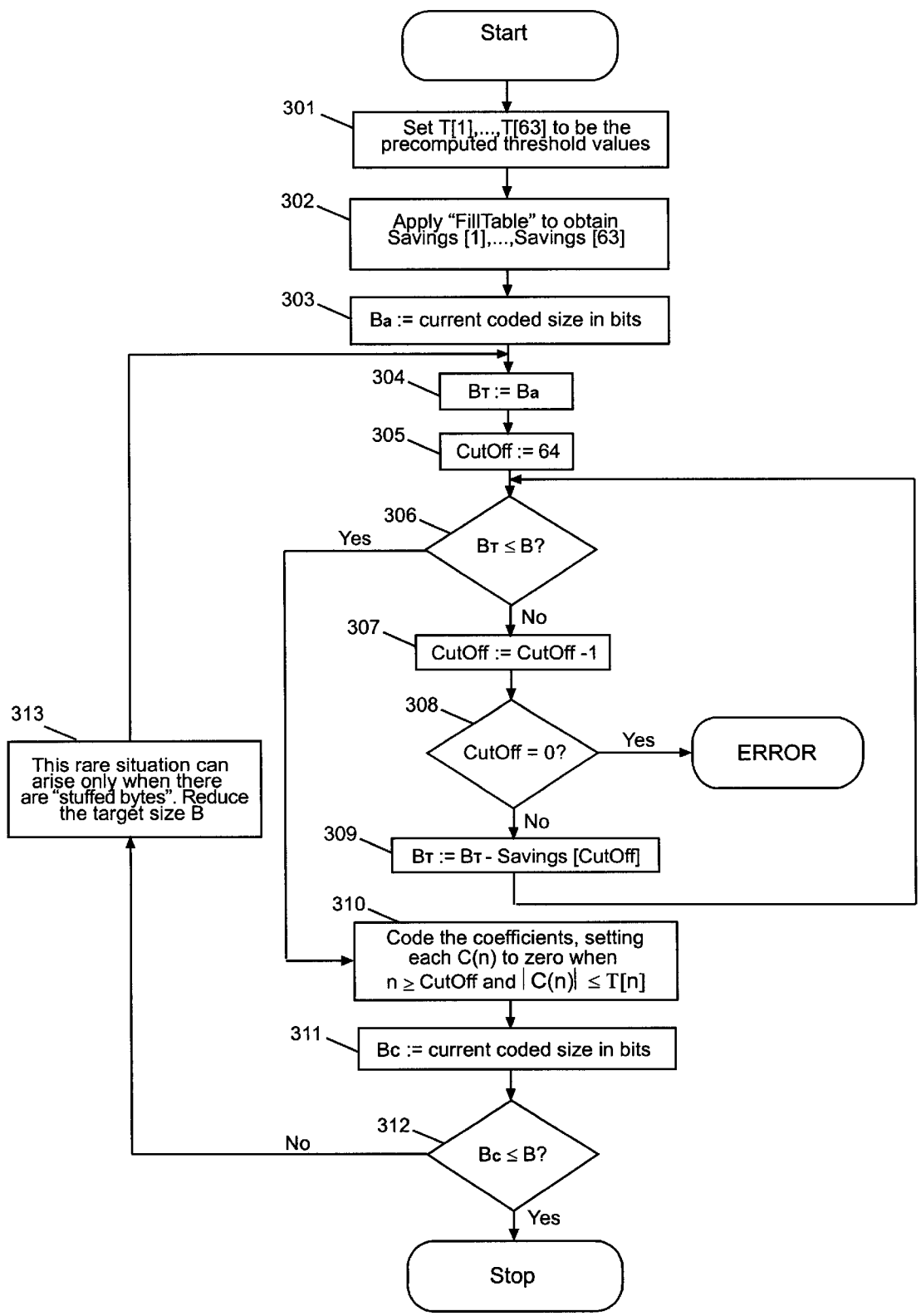
FIG. 3 is flow diagram illustrating a transcoding technique in accordance with the present invention.

FIG. 3 is a flow diagram illustrating a transcoding process in accordance with the present invention. The process, given a target size B in bits, begins at step 301 where the predefined thresholds T[1]J, . . . , T[63] J are set. Next, the procedure "FillTable" is applied to obtain the exact incremental bit-savings for each cutoff value, in the table Savings [1], . . . , Savings[63] (step 302). In step 303, the variable $B_a$ is set to be the current coded size in bits of the JPEG image. Note that in an application where the quantized DCT coefficients have been obtained as a result of a compressed-domain operation on some JPEG file, $B_a$ will have to be determined by actually going through Huffman coding. In this case, the calculations done in FillTable (step 302) can be combined with the coding in step 303 into a single pass through the data.

Next, in step 304, the variable BT, which denotes the coded size after thresholding, is initialized to be equal to $B_a$. The thresholding cutoff (denoted by the variable "CutOff") is initialized to 64 (i.e., no thresholding) in step 305. The loop of steps 306 through 309 reduces CutOff until $B_T$ falls below B. This is done as follows: in step 306, the current value of $B_T$ is compared with B. If $B_T$ is no more than B, then the loop is broken and execution proceeds to the coding step 310. Otherwise, CutOff is reduced by 1 in step 307. Next, step 308 checks whether CutOff has been reduced all the way down to 0. In this case, no amount of thresholding will allow the target budget B to be met, and the algorithm reports an error. The application can handle the error by either increasing the thresholds T[1], . . . , T[631 ] and reapplying FSBJT, or by showing an error message. In step 309, the computed value of the coded size $B_T$ is updated by subtracting the value Savings[CutOff], and the loop returns to step 306.

After step 306 has ascertained that $B_T$ is no more than the target B, the quantized coefficients are coded, while thresholding each coefficient C(n) when n ≧ CutOff and |C(n)|≧T [n] (step 310). Step 311 sets $B_c$ to be the new coded size in bits. Since the Savings[ ]table values are exact, $B_c$ should be exactly equal to $B_T$. However, there is a possible small amount of bits which is not included in the computations done by "FillSavings." These are the pad-bytes used in JPEG: whenever the value 0×FF occurs in the coded bit-stream at a byte-aligned boundary, JPEG specifications require that an extra byte (0×00) be inserted in the bit-stream. However, these stuffed bytes are very rare, as long strings of bit-value 1 typically correspond to the least likely Huffman codes. In a normal execution of FSBJT, the problem is easily solved by starting with a slightly lower bit target B than what is desired. However, for completeness, we have included the check of step 312, where $B_c$ is compared with the target B. If $B_c$ ≦B, then the target has been achieved, and the algorithm successfully terminates. Otherwise, execution proceeds to step 313, where the bit budget B is reduced by an amount slightly exceeding the number of pad-bits found, whence the algorithm returns to step 304.

Figure 4:
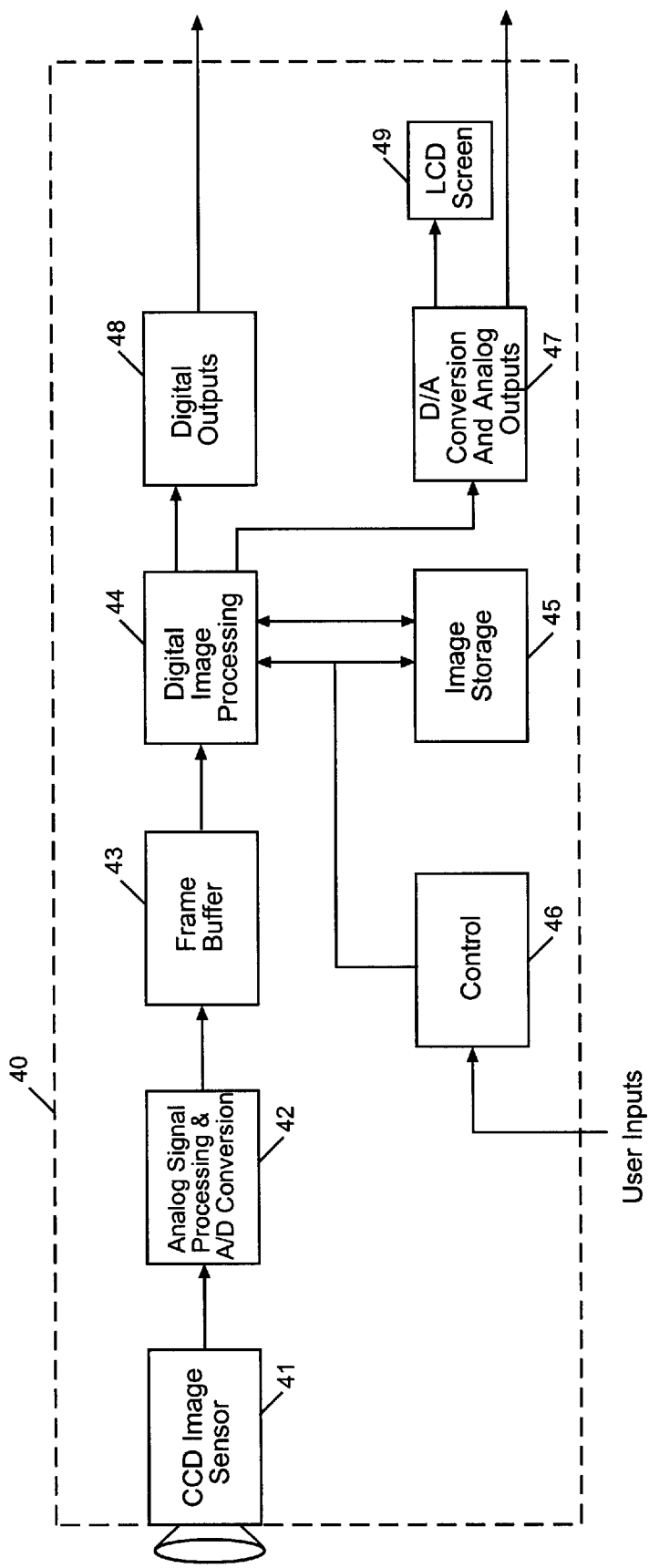
FIG. 4 is a block diagram of a digital still-image camera (DSC) in which the present invention may be embodied.

The transcoding technique of the present invention may be implemented by various digital imaging devices including a digital still-image camera (DSC), a block diagram of which is illustrated in FIG. 4. Operating under microprocessor control, the DSC 40 has a charge-coupled device (CCD) image sensor 41 that captures an image and converts it to an analog electrical signal. The analog signal is then processed and digitized in block 42, after which the digital image is temporarily stored in a frame buffer 43 while it undergoes digital processing in block 44. The digital image processing in block 44 comprises several functions including compression and decompression and may also include the transcoding technique of the present invention. The transcoding technique as well the compression and decompression functions may be performed by a processor executing a program of instructions embodied in the camera's software package or by using appropriate hardware circuitry. Image data is transferred between processing block 44 and in-camera storage 45 which stores compressed image data. User operated controls 46 may be used to control this transfer. Image storage 45 may comprise any one or more of a variety of suitable storage/recording mediums including compact magnetic or solid-state storage media, either removable or fixed within the DSC 40, and may include removable, large-capacity PCMCIA-format hard disk cards or flash memory cards.

The DSC 40 includes analog and digital outputs, 47 and 48 respectively, through which image data may be transmitted within the DSC or to external devices. Uncompressed image data may be transmitted, via the analog outputs 47, to an LCD screen 49 within the DSC 40, or to external devices such as a VCR or TV monitor. Image data, whether compressed or uncompressed, may also be transmitted through the digital outputs 48 to a digital device such as a general purpose digital computer where the image data may be processed in accordance with the invention and/or displayed.

Figure 5:
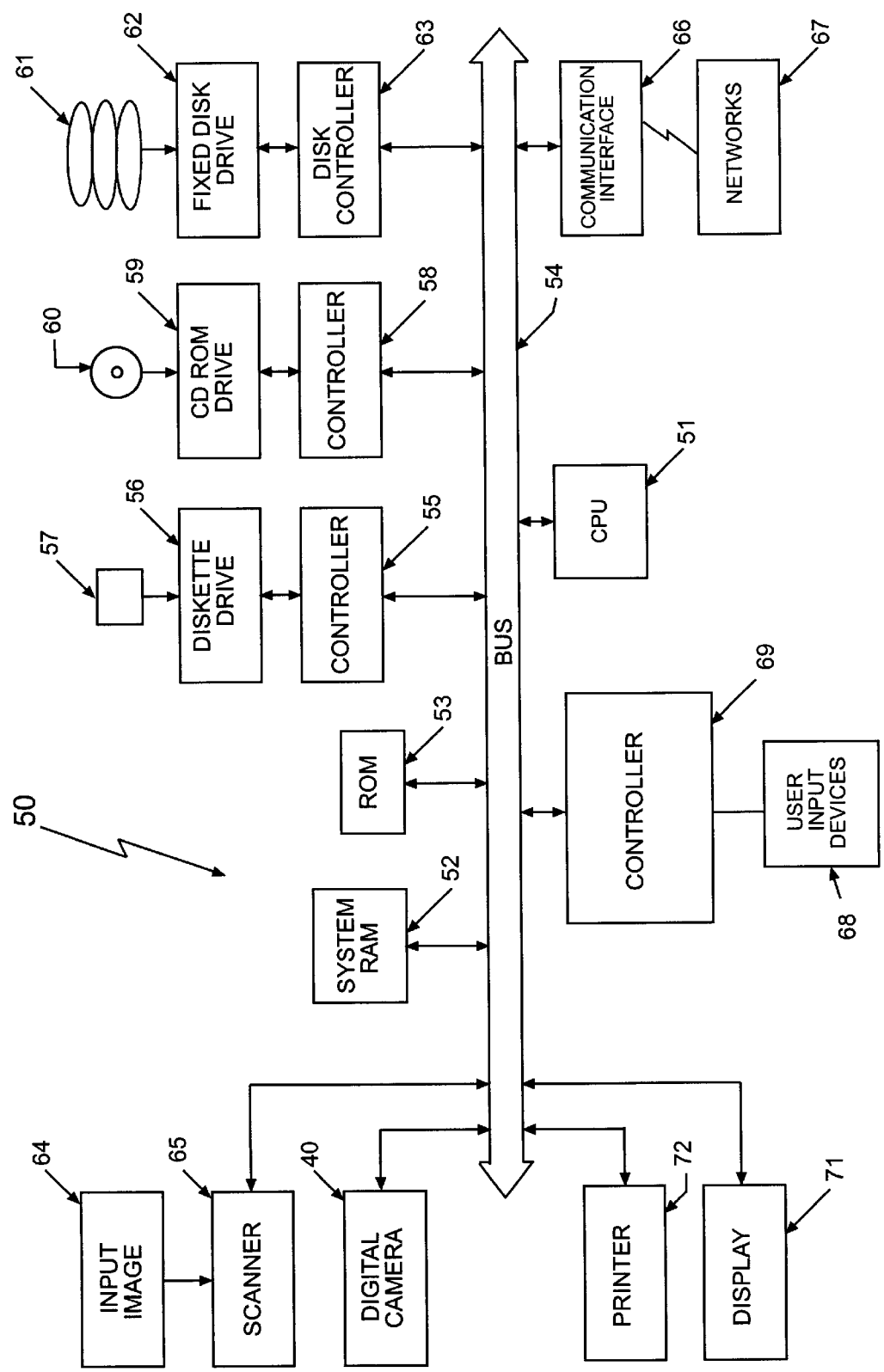
FIG. 5 is a block diagram of a computer system illustrating the interrelationship between various components that may be used in capturing and viewing digital images, as well as processing such images in accordance with the invention.

FIG. 5 illustrates a computer system which shows the interrelationship between the DSC 40, various computer components and other peripheral devices. The computer system, identified generally by reference numeral 50, may be of any suitable type such as a main frame, personal computer or laptop computer.

Computer system 50 comprises a central processing unit (CPU) 51 which may be a conventional microprocessor, a random access memory (RAM) 52 for temporary storage of information, and a read only memory (ROM) 53 for longer term storage of information. Each of these components is coupled to a bus 54. Operation of the computer system 50 is typically controlled and coordinated by operating system software. The operating system, which is embodied in the system memory and runs on CPU 51, coordinates the operation of computer system 50 by controlling allocation of system resources and performing a variety of tasks, such as processing, memory management, networking and I/O functions, among others.

Also coupled to bus 54 by a controller 55 is a diskette drive 56 into which a non-volatile mass storage device such as a diskette 57 may be inserted. Similarly, a controller 58 interfaces between bus 54 and a compact disc (CD) ROM drive 59 which is adapted to receive a CD ROM 60. A hard disk 61 is provided as part of a fixed disk drive 62 which is coupled to bus 54 by a disk controller 63.

Program instructions for the transcoding technique of this invention may be stored in RAM 52 or ROM 53, or may be stored on storage devices 57, 60 or 61 and transferred to the CPU 51 for execution. More broadly, such instructions may be embodied on any recording medium that is able to provide instructions to CPU 51. In addition to those mentioned above, other common forms of such processor-readable media include, for example, optical mediums such as an optical disk, magnetic mediums such as magnetic tape, physical mediums with patterns of holes such as punch cards, various PROMs such as a PROM, EPROM, EEPROM or FLASH-EPROM, any other memory chip or cartridge, or a carrier wave (to be described).

Image data to be processed in accordance with the invention may be stored in any one or more of the recording mediums mentioned above. In addition, an input image 64 from an external source may be digitized by a scanner 65 for storage and/or processing by computer 50. Images captured, digitized and compressed by the DSC 40 can be transmitted to the computer 50, as previously explained.

Image data and computer instructions may also be transferred to and from computer 50 from remote locations. To this end, computer 50 may also include a communication interface 66 which enables computer system 50 to communicate with other systems through any one or more of a variety of networks 67, including local area networks (LANs), the internet and online services, via direct connection, modem, or wireless communication. In any such configuration, communication interface 66 sends and receives electrical, electromagnetic or optical signals that carry data streams representing various types of information. These signals, which carry data to and from computer system 50, are exemplary forms of carrier waves for transporting program code for the transcoding technique of the present invention. Such program code received in this manner may be executed by CPU 51 as it is received or stored for later execution.

To facilitate the input and output of data, computer system 50 further includes user input devices 68, which may comprise, for example, a keyboard and mouse. These devices 68 are coupled to bus 54 via a controller 69. A monitor display 71 and a printer 72 are provided for viewing and printing data.

As the foregoing description demonstrates, the transcoding technique of the present invention is particularly well suited to be implemented by digital camera 40 and/or computer system 50. However, the transcoding technique may be implemented by other digital image processing devices as well. Moreover, the transcoding technique may be implemented using hardware, software, or combination thereof. With that in mind, it is to be understood that the block and flow diagrams used to illustrate the technique of the present invention show the performance of certain specified functions and relationships thereof. The boundaries of these functional blocks have been arbitrarily defined herein for the convenience of description. Alternate boundaries may be defined so long as the specified functions and relationships thereof are appropriately formed. Similarly, the pseudo-code used to illustrate features of the transcoding algorithm of the present invention does not depict syntax or any particular programming language. Rather, the diagrams and accompanying description (including pseudo-code) provide the functional information one skilled in the art would require to fabricate circuits or to write software code to perform the processing required. Each of the functions depicted in the block diagrams may be implemented, for example, by software instructions, a functionally equivalent circuit such as a digital signal processor circuit, an application specific integrated circuit (ASIC) or combination thereof.

While the invention has been described in conjunction with specific embodiments, it will be evident to those skilled in the art in light of the foregoing description that many further alternatives, modifications and variations are possible. The present invention is intended to embrace all such alternatives, modifications, applications and variations as may fall within the spirit and scope of the appended claims.

What is claimed is:

1. A method of generating a second array of frequency-ordered coefficients from a first array of frequency-ordered coefficients, comprising the steps of:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining step further comprises determining savings values, each value of which is indicative of a number of bits that would be saved by reducing the cutoff ordinal number from n +1 to n.

2. A method of generating a second array of frequency-ordered coefficients from a first array of frequency-ordered coefficients, comprising the steps of:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining step further comprises generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value T[n].

3. The method of claim 2, wherein each savings value in the array of savings values is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n +1 and having a magnitude less than or equal to T[n +1].

4. The method of claim 2, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

5. The method of claim 1, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

6. A method of generating a second JPEG file within a predetermined bit budget from a first JPEG file exceeding the predetermined bit budget, comprising the steps of:

recovering an array of frequency-ordered coefficients from the first JPEG file;

establishing an array of predetermined threshold values, one corresponding to each of the coefficients in the first array of frequency-ordered coefficients;

determining a cutoff ordinal number in the first array of frequency-ordered coefficients by generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value T[n]; and setting to zero each of the frequency coefficients in the first array having an ordinal number greater than or equal to the determined cutoff ordinal number and having a magnitude less than or equal to its corresponding threshold value to generate the second array of frequency-ordered coefficients.

7. The method of claim 6, wherein each savings value in the array of savings values is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n +1 and having a magnitude less than or equal to T[n +1].

8. The method of claim 6, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

9. An imaging device comprising means for performing a method of generating a second array of frequency-ordered coefficients from a first array of frequency-ordered coefficients, said means for performing comprising at least one of a program of instructions executable by the imaging device and hardware, said method comprising the steps of:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining step further comprises determining savings values, each value of which is indicative of a number of bits that would be saved by reducing the cutoff ordinal number from n +1 to n.

10. An imaging device comprising means for performing a method of generating a second array of frequency-ordered coefficients from a first array of frequency-ordered coefficients, said means for performing comprising at least one of a program of instructions executable by the imaging device and hardware, said method comprising the steps of:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining step further comprises generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value T[n].

11. The imaging device of claim 10, wherein each savings value in the array of savings values is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n +1 and having a magnitude less than or equal to T[n +1].

12. The imaging device of claim 10, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

13. The imaging device of claim 9, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

14. A digital camera for generating a second plurality of blocks of frequency-ordered coefficients from a first plurality of blocks of frequency-ordered coefficients, comprising:
a sensor for capturing light and converting the light into an analog image signal;
an analog-to-digital converter for converting the analog image signal to a digital image in spatial domain; and
a digital image processor which compresses the digital image from a spatial domain representation to a first linear-transform-based compressed file representation, and wherein said digital image processor recovers the first plurality of blocks of frequency-ordered coefficients from the first compressed file, establishes an array of predetermined threshold values, one corresponding to each coefficient ordinal number in the first plurality of blocks of frequency-ordered coefficients, determines a cutoff ordinal number in the first plurality of blocks of frequency-ordered coefficients by generating an array of savings values, one corresponding to each ordinal number in the first plurality of blocks, each savings value being indicative of a number of bits that would be saved by setting to zero all of the coefficients in the first plurality of blocks having an ordinal number greater than or equal to the corresponding ordinal number (n) and having a magnitude less than or equal to the corresponding threshold value T[n], and sets to zero each of the frequency coefficients in the first plurality of blocks having an ordinal number greater than or equal to the determined cutoff ordinal number and having a magnitude less than or equal to its corresponding threshold value to generate the second plurality of blocks of frequency-ordered coefficients.

15. The digital camera of claim 14, wherein each savings value in the array of savings values is an incremental number of bits that would be saved by setting to zero all of the coefficients in the first plurality of blocks having an ordinal number greater than or equal to n and having a magnitude less than or equal to T[n] relative to setting to zero all of the coefficients in the first plurality of blocks having an ordinal number greater than or equal to n +1 and having a magnitude less than or equal to T[n +1].

16. The digital camera of claim 14, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

17. A system having means for performing a method of generating a second array of frequency-ordered coefficients from a first array of frequency-ordered coefficients, said means for performing comprising at least one of a program of instructions executable by the system and hardware, said method comprising the steps of:
establishing an array of predetermined threshold values, one corresponding to each of the coefficients in the first array of frequency-ordered coefficients;
determining a cutoff ordinal number in the first array of frequency-ordered coefficients; and
setting to zero each of the frequency coefficients in the first array having an ordinal number greater than or equal to the determined cutoff ordinal number and having a magnitude less than or equal to its corresponding threshold value to generate the second array of frequency-ordered coefficients;
wherein said determining step further comprises determining savings values, each value of which is indicative of a number of bits that would be saved by reducing the cutoff ordinal number from n +1 to n.

18. A system having means for performing a method of generating a second array of frequency-ordered coefficients from a first array of frequency-ordered coefficients, said means for performing comprising at least one of a program of instructions executable by the system and hardware, said method comprising the steps of:
establishing an array of predetermined threshold values, one corresponding to each of the coefficients in the first array of frequency-ordered coefficients;
determining a cutoff ordinal number in the first array of frequency-ordered coefficients; and
setting to zero each of the frequency coefficients in the first array having an ordinal number greater than or equal to the determined cutoff ordinal number and having a magnitude less than or equal to its corresponding threshold value to generate the second array of frequency-ordered coefficients;
wherein said determining step further comprises generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value T[n].

19. The system of claim 18, wherein each savings value in the array of savings values is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n +1 and having a magnitude less than or equal to T[n +1].

20. The system of claim 18, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

21. The system of claim 17, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

22. A digital signal processor circuit for generating a second array of frequency-ordered coefficients from a first array of frequency-ordered coefficients, comprising:

means for establishing an array of predetermined threshold values, one corresponding to each of the coefficients in the first array of frequency-ordered coefficients;

means for determining a cutoff ordinal number in the first array of frequency-ordered coefficients; and means for setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining means further comprises means for determining savings values, each value of which is indicative of a number of bits that would be saved by reducing the cutoff ordinal number from n +1 to n.

23. A digital signal processor circuit for generating a second array of frequency-ordered coefficients from a first array of frequency-ordered coefficients, comprising:

means for establishing an array of predetermined threshold values, one corresponding to each of the coefficients in the first array of frequency-ordered coefficients;

means for determining a cutoff ordinal number in the first array of frequency-ordered coefficients; and means for setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining means further comprises means for generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value $T[n]$.

24. The digital signal processor circuit of claim 23, wherein each savings value in the array of savings values is an incremental number of bits that would be saved by setting to zero all of the coefficients in the first array having an ordinal number greater than or equal to n and having a magnitude less than or equal to $T[n]$ relative to setting to zero all of the coefficients in the first array having an ordinal number greater than or equal to n +1 and having a magnitude less than or equal to $T[n +1]$.

25. The digital signal processor circuit of claim 23, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

26. The digital signal processor circuit of claim 22, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

27. A processor-readable medium having a program of instructions embodied therein for causing a processor to generate a second array of frequency-ordered coefficients from a first array of frequency-ordered coefficients, said program including instructions for:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining instructions further comprises instructions for determining savings values, each value of which is indicative of a number of bits that would be saved by reducing the cutoff ordinal number from n +1 to n.

28. A processor-readable medium having a program of instructions embodied therein for causing a processor to generate a second array of frequency-ordered coefficients from a first array of frequency-ordered coefficients, said program including instructions for:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining instructions further comprises instructions for generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value $T[n]$.

29. The processor-readable medium of claim 28, wherein each savings value in the array of savings values is an incremental number of bits that would be saved by setting to zero all of the coefficients in the first array having an ordinal number greater than or equal to n and having a magnitude less than or equal to $T[n]$ relative to setting to zero all of the coefficients in the first array having an ordinal number greater than or equal to n +1 and having a magnitude less than or equal to $T[n +1]$.

30. The processor-readable medium of claim 28, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

31. The processor-readable medium of claim 27, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

32. A carrier wave encoded to transmit a program of instructions executable by a machine to perform a method of generating a second array of frequency-ordered coefficients from a first array of frequency-ordered coefficients, said program including instructions for:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining instructions further comprises instructions for determining savings values, each value of which is indicative of a number of bits that would be saved by reducing the cutoff ordinal number from n +1 to n.

33. A carrier wave encoded to transmit a program of instructions executable by a machine to perform a method of generating a second array of frequency-ordered coefficients from a first array of frequency-ordered coefficients, said program including instructions for:

establishing an array of predetermined threshold values, one corresponding to each of the coefficients in the first array of frequency-ordered coefficients;

determining a cutoff ordinal number in the first array of frequency-ordered coefficients; and setting to zero each of the frequency coefficients in the first array having an ordinal number greater than or equal to the determined cutoff ordinal number and having a magnitude less than or equal to its corresponding threshold value to generate the second array of frequency-ordered coefficients;

wherein said determining instructions further comprises instructions for generating an array of savings values, one corresponding to each ordinal number in the first array, each savings value being indicative of a number of bits that would be saved by setting to zero all of the coefficients in the first array having an ordinal number greater than or equal to the corresponding ordinal number (n) and having a magnitude less than or equal to the corresponding threshold value T[n].

34. The carrier wave of claim 33, wherein each savings value in the array of savings values is an incremental number of bits that would be saved by setting to zero all of the coefficients in the first array having an ordinal number greater than or equal to n and having a magnitude less than or equal to T[n] relative to setting to zero all of the coefficients in the first array having an ordinal number greater than or equal to n +1 and having a magnitude less than or equal to T[n +1].

35. The carrier wave of claim 33, wherein each savings value in the array of savings values is computed by adding the bits needed to code a run of zeros preceding the $n^{th}$ coefficient and a run of zeros following the $n^{th}$ coefficient and subtracting the bits needed to code a combined longer run of zeros including the runs of zeros preceding and following the $n^{th}$ coefficient while factoring into the computation runs of zeros longer than a predetermined number and end-of-block conditions.

36. The carrier wave of claim 32, wherein the first array of frequency-ordered coefficients, when encoded into a compressed bit-stream, exceeds a predetermined bit budget, and the second array of frequency-ordered coefficients, when encoded into a compressed bit-stream, satisfies the predetermined bit budget.

* * * * *